United States Patent
Manry, IV et al.

(10) Patent No.: US 6,549,996 B1
(45) Date of Patent: Apr. 15, 2003

(54) SCALABLE MULTIPLE ADDRESS SPACE SERVER

(75) Inventors: William F. Manry, IV, Monte Sereno, CA (US); Henry Willard, San Francisco, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/347,439

(22) Filed: Jul. 2, 1999

(51) Int. Cl.[7] .............................................. G06F 12/00
(52) U.S. Cl. ........................ 711/203; 711/209; 711/147
(58) Field of Search ................................. 711/202, 203, 711/208, 209, 215, 220, 211, 147

(56) References Cited

U.S. PATENT DOCUMENTS

| | | | | |
|---|---|---|---|---|
| 5,590,326 A | * | 12/1996 | Manabe | 711/150 |
| 5,729,710 A | * | 3/1998 | Magee et al. | 711/203 |
| 5,860,144 A | * | 1/1999 | Frank et al. | 711/206 |
| 6,055,617 A | * | 4/2000 | Kingsbury | 711/203 |
| 6,067,608 A | * | 5/2000 | Perry | 711/203 |

* cited by examiner

Primary Examiner—Matthew Kim
Assistant Examiner—Matthew D. Anderson
(74) Attorney, Agent, or Firm—Brian D. Hickman; Hickman Palermo Truong & Becker LLP

(57) ABSTRACT

A method and apparatus are provided for managing the amount of memory available to processes within the computer system. Additional virtual address spaces are dynamically created to make more memory available to computer processes. The computer processes executing in each virtual address space access a shared memory region. Also, when a user requests a new connection to the computer system to form a new user session, it is determined to which of the existing virtual address spaces the new user session would best be assigned so as to maintain a load balance among the existing virtual address spaces.

42 Claims, 3 Drawing Sheets

SCALABLE MULTIPLE ADDRESS SPACE SERVER

FIELD OF THE INVENTION

This invention relates to databases and, more specifically, to methods and apparatus for managing the amount of memory available to processes within the computer system.

BACKGROUND OF THE INVENTION

It cannot be gainsaid that the amount of memory available to a computer application program is a primary concern for most program developers and users. An address space is the amount of memory available to a computer application program and is the set of all addresses in memory that is available for use by an application program.

The address space can be larger than the main memory for a given computer platform by employing the concept of virtual memory. Virtual memory is an imaginary memory area supported by most operating systems. Application programs use virtual addresses rather than real addresses to store instructions and data. During execution of an application program, only those portions of the application program needed at a given point during execution are copied into main memory.

However, the size of the address space is a function of the operating system and hardware platform. For most binary machines the address space is equal to $2^{}n$, where n is the number of bits in the absolute address. For example, the IBM OS/390 is a 31-bit machine and thus, the size of the address space is up to $2^{}31$ bytes or 2 gigabytes of memory. An address space of limited size imposes a limit on the number of computer processes that can be executed at any given time. In the case of relational database systems, there is a set of memory structures and processes called a database server. The database server performs the work of a database system by using the set of memory structures and processes to communicate with user processes and to control and manipulate data. The amount of memory available to a database server is limited by the size of the address space imposed by the operating system and hardware platform of the database server. Various approaches have been tried to avoid the address space size limitation.

In one approach, Transaction Processing monitors ("TP monitors") are used to circumvent the limited amount of memory available to a database server. For example, assume there are 100,000 concurrent user sessions for a particular database server. The TP monitor is used to manage the user sessions such that, at any given time, the database server sees only a fraction of the total number of sessions.

One drawback to this approach is that the application programs have to be specifically designed to take advantage of TP monitors. Also, TP monitors do not maintain continuous session state information. Many application programs used in relational database systems require the maintenance of continuous session state information. For example, assume that a user requested to look at 1000 records from the database. However, as a practical matter, the user sees only a small subset of the records at a time. The session state information keeps track of what records are left to fetch for the user's session. Thus, the use of a TP monitor or other intermediate servers imposes design limitations on application programs and is therefore not a general solution to the problem of limited address space.

In another approach, parallel servers are employed to allow multiple database servers to share a single database. That is, two or more database servers running on two or more different machines provide parallel access to the same database. However, the disadvantage to using parallel servers is the high overhead costs due to the operational complexity and additional hardware. Another disadvantage to using parallel servers is the degraded reliability and performance as compared to a single non-parallel server database server that is supporting the same user sessions.

Based on the foregoing, there is a need for a method or mechanism to increase the amount of memory available to computer processes.

SUMMARY OF THE INVENTION

The foregoing needs are addressed by the present invention, which comprises, in one aspect, a method and system for managing the amount of memory available to processes within a computer system.

According to one aspect of the invention, additional virtual address spaces are dynamically created to make more memory available to processes. According to another aspect, the processes executing in each virtual address space access a shared memory region.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system are described for managing the amount of memory available to processes within a computer system. In the following description, for the purposes of explanation, numerous specific details are set forth in order to provide a thorough understanding of the present invention. It will be apparent, however, to one skilled in the art that the present invention may be practiced without these specific details. In other database servers, well-known structures and devices are shown in block diagram form in order to avoid unnecessarily obscuring the present invention.

HARDWARE OVERVIEW

Figure 1:
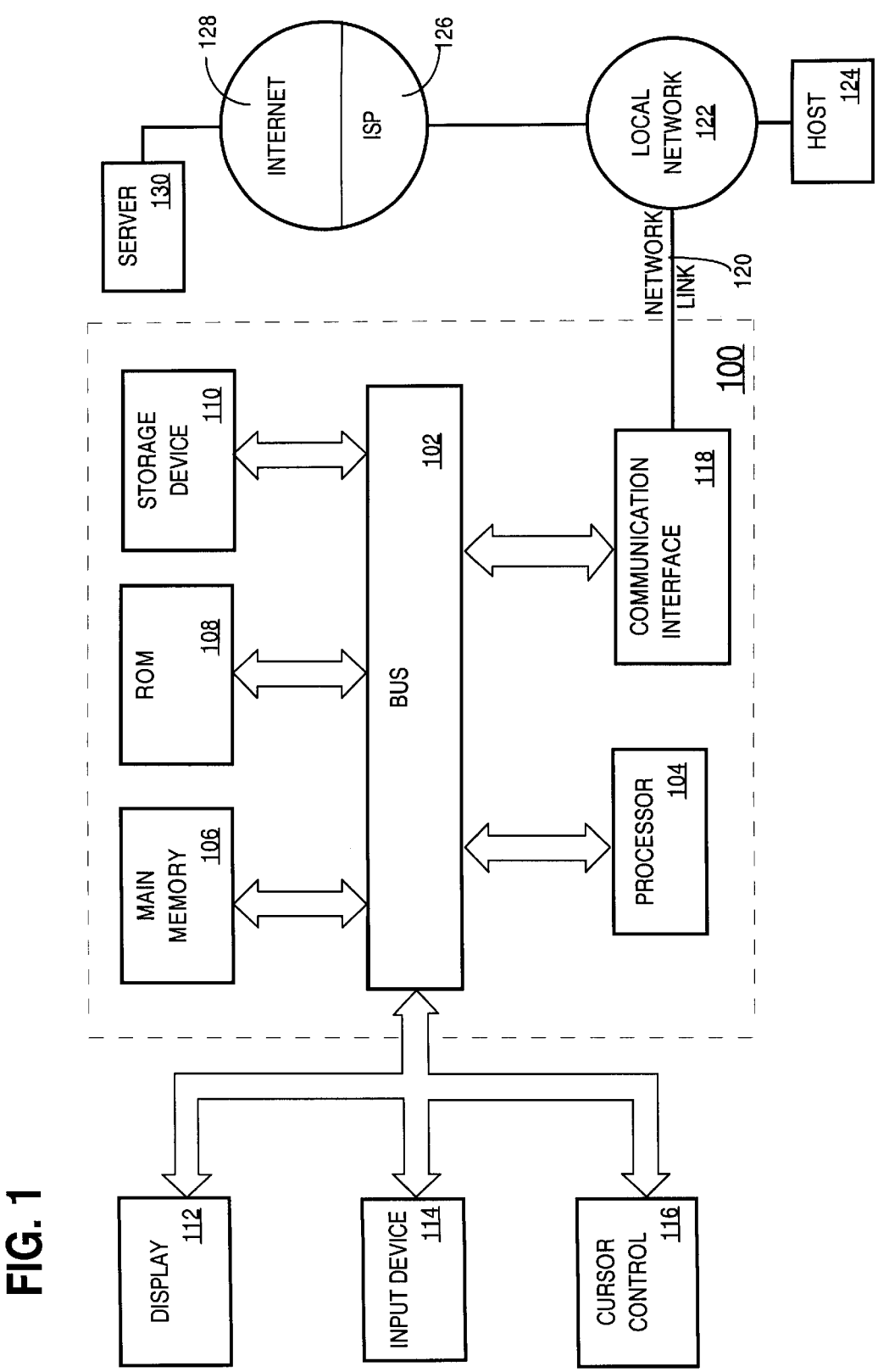
FIG. 1 is a block diagram illustrating a computer system on which embodiments of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for managing the amount of memory available to processes within a computer system. According to one embodiment of the invention, managing the amount of memory available to processes within a computer system is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for managing the amount of memory available to processes within a computer system as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

In one embodiment of the invention, the database server capacity limit imposed by the 31-bit addressing architecture of the host platform, IBM OS/390, is overcome by allowing a single database server on the OS/390 platform to support a marked increased number of user sessions by making logical elements that reside in multiple virtual address spaces operate as a single database server.

In past implementations, a single OS/390 database server could only support a very limited number of concurrent user sessions because all the logical elements of the database erver resided in a single virtual address space. The logical elements of the database server include memory structures, such as the Shared Global Area ("SGA"). The SGA includes a database buffer cache and a Shared Pool that is used to store and manipulate information about the Oracle database and the Structured Query Language ("SQL") statements that are being processed against the database. SQL is the language used to create and access the database. Further, the logical elements of the database server also include the Process Global Area, a memory buffer that contains session information. According to one existing implementation, a single virtual address space, on average, can only support 1000 to 2000 concurrent user sessions at a given time.

Each database server has its own SGA. When multiple users are concurrently connected to the same database server, the data in the database server's SGA is shared among the users. According to an embodiment of the invention, logical elements in each of multiple virtual address spaces access the same SGA, thereby functioning as part of the same database server. Because multiple virtual address spaces operate as a single database server, there is more memory available for processes and session information associated with any additional concurrent user sessions.

According to one embodiment, logical elements in multiple virtual address spaces operate as a single database server by mapping an identical range of virtual addresses in each of the virtual address spaces to the same shared physical memory location. The shared physical memory comprises the Shared Global Area of the database server whose elements are spread among the multiple virtual address spaces.

According to the embodiment, a new virtual address space can be added to the host platform whenever it is determined that more virtual addresses are needed to store process and session data structures. Also, when a user requests a new connection to the relational database system to form a new user session, it is then determined to which of the existing virtual address spaces the new user session would best be assigned so as to maintain a load balance among the existing virtual address spaces. For example, information on the nature and amount of activity in each virtual address space can be maintained in a "metrics table". Thus, when a new user session is to be added to the relational database system, the metrics table is examined to determine to which virtual address space the new user session is to be added.

Figure 2:
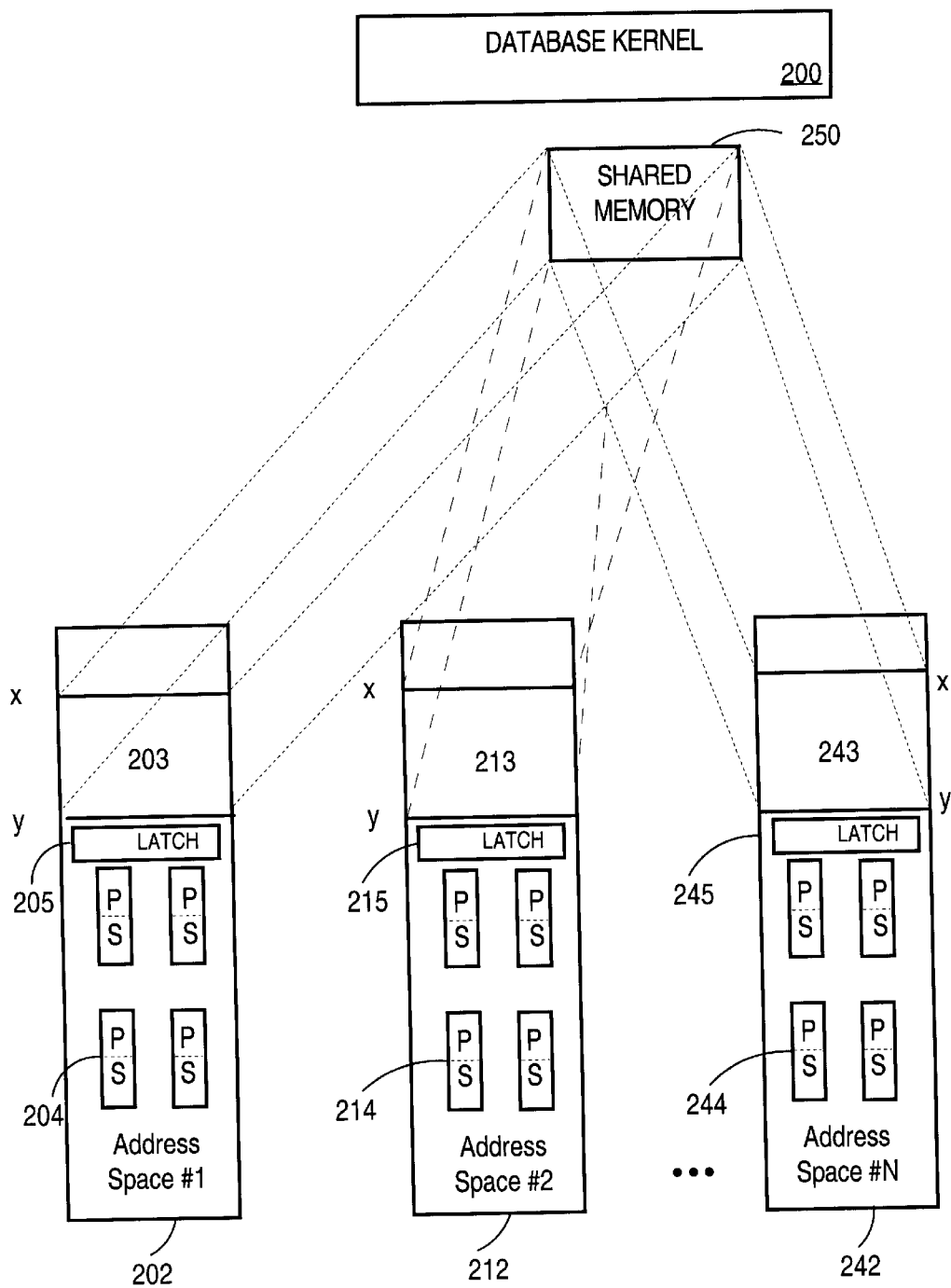
FIG. 2 is a block diagram that illustrates a set of virtual address spaces operating as a single database server.

FIG. 2 is a block diagram illustrating N number of virtual address spaces, 202, 212, . . . , 242. Block 200 represents the database Kernel that, in the illustrated embodiment, is the part of the relational database management system code that runs the SQL requests from users. Each address space contains process and session data structures. For example, 204, 214, and 244 represent process and session data structures in address spaces, 202, 212, and 242. Furthermore, an identical range of virtual addresses, x to y, in each virtual address space 203, 213, . . . , 243 is mapped to a physical shared memory region 250.

NUMBER OF VIRTUAL ADDRESS SPACES

According to one embodiment, the system administrator of the relational database system sets the minimum and maximum number of virtual address spaces. The minimum number of virtual address spaces is the set of virtual address spaces that is created at the very outset of creating a database server. Once the minimum number of virtual address spaces is created, user sessions that get connected to the relational database system are distributed among the virtual address spaces that have been created. As for the maximum number of virtual address spaces, it may be any number up to the limit imposed by hardware constraints of the host platform. For example, an OS/390 platform could probably accommodate about 1000 virtual address spaces. The needs of a typical database server are not expected to exhaust the upper limit of 1000 virtual address spaces. In one embodiment, an arbitrary upper limit of 256 virtual address spaces is imposed for a given database server.

DISPATCHABLE UNITS AND LATCHES

Elements within multiple virtual address spaces can operate as a single database server because, not only do they share the same SGA, but there is also a mechanism to tie-in the correct process and session data associated with the activity in a user session. To illustrate, assume that user #1, executing a database application #1, requests to open a session #1 from the database server and through session #1 performs an operation on data in the database. At the time session #1 is opened, session #1 is assigned to one of the existing address space ("assigned virtual address space"). The assignment process returns to user #1 a token that uniquely identifies session #1 and its assigned virtual address space. User #1 supplies the token as part of the requests that user #1 issues to the database server in session #1. The token is used to pass execution control into the assigned server virtual address space and it identifies the session from which the request issued. As a result of passing execution a control, the processing of the database requests now execute in the virtual address space to which they have been assigned. The execution control is passed from the address space where the application program #1 resides ("home address space") to the assigned virtual address space by changing the hardware state information in the kernel in a manner that causes the execution to switch to the assigned virtual address space. The kernel is that part of the operating system responsible for allocating hardware resources to the application programs running under the operation system. A dispatchable unit refers to a set of state information required to execute instructions on a Central Processing Unit ("CPU"). The state information includes hardware register contents, address space or addressing bounds, program counter, etc. Thus, user #1 issues a database request in session #1 using the dispatchable unit associated with the home address space but the processing of the request (fetching data or instructions) occur in the assigned virtual address space by appropriately changing the state information in the kernel.

Further assume that user #1, executing a database application #2, requests a new session, session #2. At the time session #2 is opened, session #2 is assigned to one of the existing address space. The assignment process returns to user #1 a token that uniquely identifies session #2 and its assigned address space. User #1 supplies the token as part of the requests issued to the database server. Thus, session #2 is associated with its own process and session data that resides in one of the virtual address spaces. If in session #2, user #1 causes the database application program to execute a transaction that performs an operation on data from the database, a dispatchable unit associated with the home address space executes a request in the kernel to change the hardware state information in a manner that causes the execution of the transaction to occur in the virtual address space assigned to session #2. Thus, the Kernel knows which process and session data to use to execute the logic of the database engine with respect to user #1 's session #2.

Further, a latching mechanism 205, 215, and 245 is used to manage data access by the various user sessions. The latching mechanism is part of the SGA and thus is visible to all user sessions in a particular database server. For example, when a process from user #1's session #1 is updating a piece of data, the process employs a latch to lock that piece of data. Another process from another user session may not access that same piece of data until the process from user #1's session #1 releases the latch. Because the latching mechanism resides in a portion of physical memory that maps to a portion of all virtual address spaces, the latching mechanism works across virtual address space boundaries.

Figure 3:
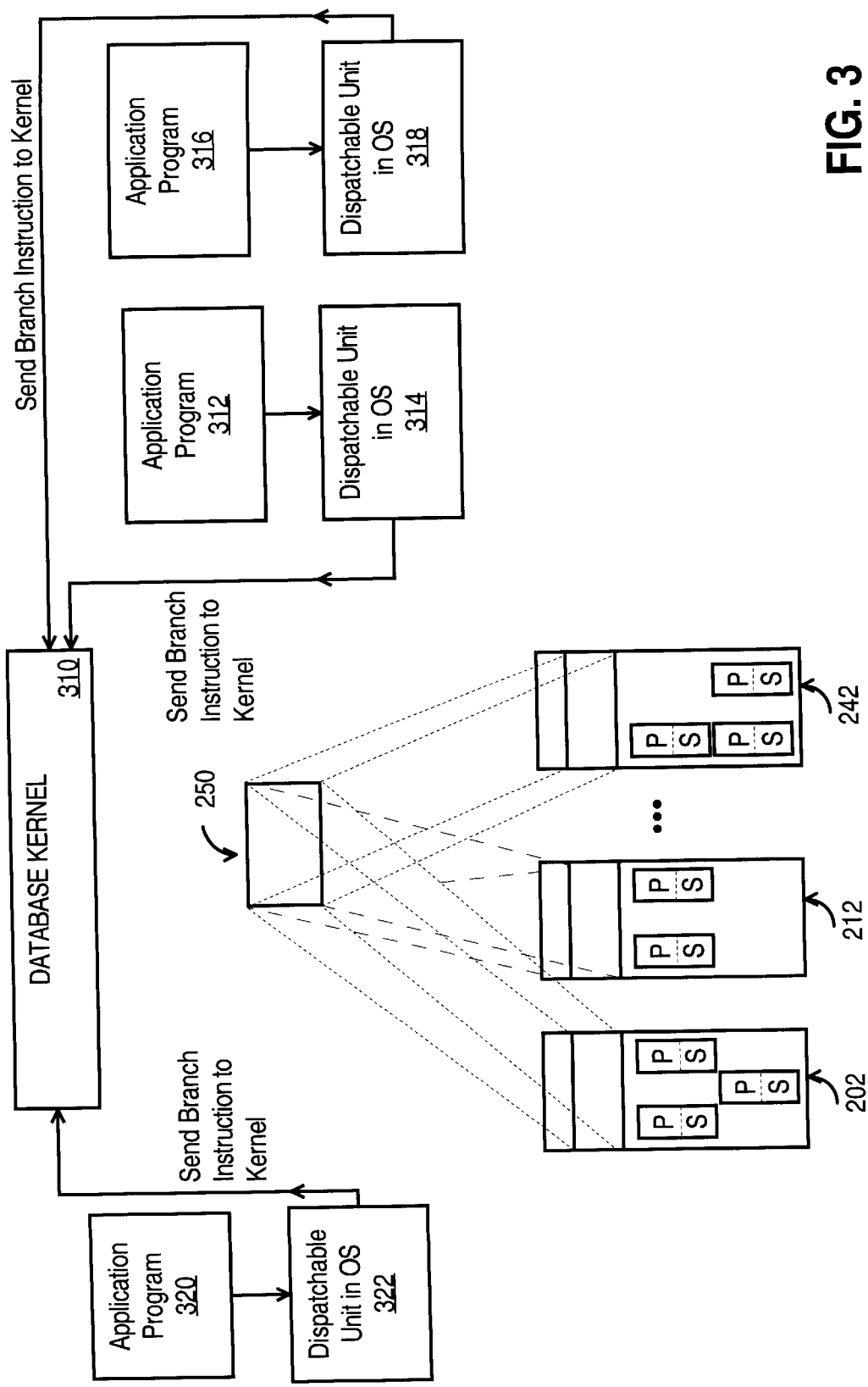
FIG. 3 is a block diagram illustrating a set virtual address spaces and application programs with dispatchable units.

FIG. 3 is a block diagram illustrating the virtual address spaces 202, 212, . . . , 242 with shared memory region 250, Kernel 310, application programs 312, 316, 320 and dispatchable units 314, 318, 322. Application program 312 employs dispatchable unit 314 to execute a request in Kernel 310 to change the hardware state information in a manner to cause execution of the database requests to occur in the assigned virtual address space as identified by token associated with the database requests. Similarly, application program 316 employs dispatchable unit 318 to execute a request in Kernel 310, and application program 320 employs dispatchable unit 322 to execute a request in Kernel 310, to change hardware state information as explained above. The application programs are used to open the user sessions associated with the existing virtual address spaces for the database server to which Kernel 310 belongs.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing an amount of memory available to processes within a computer system, the method comprising the steps of:

detecting a condition that indicates that a first set of virtual address spaces do not provide sufficient memory;

in response to detecting the condition that indicates that the first set of virtual address spaces do not provide sufficient memory, dynamically creating at least one additional set of virtual address spaces to add to the first set of virtual address spaces to produce a second set of virtual address spaces; and allowing processes executing in each virtual address space of the second set of virtual address spaces to access a shared virtual memory region.

2. The method of claim 1 wherein the step for allowing processes executing in each virtual address space of the second set of virtual address spaces to access a shared virtual memory region further includes mapping the shared virtual memory region to a particular range of virtual addresses, wherein each virtual address space in the second set of virtual address spaces uses the shared virtual memory region as physical memory for the particular range of virtual addresses.

3. The method of claim 1 wherein:

the step of detecting a condition that indicates that a first set of virtual address spaces do not provide sufficient memory further includes the step of detecting a condition that indicates that one or more new sessions are to be created in the computer system; and the method further includes the step of assigning the one or more new sessions to the one or more virtual address spaces in the second set of virtual address spaces.

4. The method of claim 3 wherein the step of assigning the one or more new sessions to the one or more virtual address spaces in the second set of virtual address spaces is performed based on current usage of the first set of virtual address spaces.

5. The method of claim 3 wherein the step of assigning the one or more new sessions to the one or more virtual address spaces in the second set of virtual address spaces includes using a token to identify which virtual address space is assigned to each new session.

6. The method of claim 1 further includes selecting a minimum number of virtual address spaces to be created as the first set of virtual address spaces.

7. The method of claim 1 further includes selecting a maximum number of virtual address spaces that can be added to the first set of virtual address spaces to produce the second set of virtual address spaces.

8. The method of claim 7 further includes allowing a user to specify the maximum number of virtual address spaces that can be added to the first set of virtual address spaces to produce the second set of virtual address spaces.

9. The method of claim 1 further includes employing a latching mechanism that resides in the shared virtual memory region to lock data.

10. The method of claim 1 wherein each process executing in each virtual address space of the second set of virtual address spaces is associated with a session data that is stored in the virtual address space in which the process is executing.

11. The method of claim 10 further includes changing a hardware state information in a Kernel to cause each process executing in each virtual address space of the second set of virtual address spaces to be associated with the session data that is stored in the virtual address space in which the process is executing.

12. A method for managing an amount of memory available to processes within a computer system, the method comprising the steps of:

creating a maximum number of virtual address spaces when a server is started; and allowing processes executing in each virtual address space to access a shared memory region.

13. The method of claim 12 wherein the step for allowing processes executing in each virtual address space to access a shared memory region further includes mapping the shared memory region to a particular range of virtual addresses, wherein each virtual address space uses the shared memory region as physical memory for the particular range of virtual addresses.

14. The method of claim 12 further includes the step of assigning one or more new sessions to the virtual address spaces.

15. The method of claim 14 wherein the step of assigning the one or more new sessions to the virtual address spaces is performed based on current usage of the virtual address spaces.

16. The method of claim 14 wherein the step of assigning the one or more new sessions to the one or more virtual address spaces includes using a token to identify which virtual address space is assigned to each new session.

17. The method of claim 12 further includes allowing a user to specify the maximum number of virtual address spaces that can be created when the server is started.

18. The method of claim 12 further includes employing a latching mechanism that resides in the shared memory region to lock data.

19. The method of claim 12 wherein each process executing in each virtual address space is associated with a session data that is stored in the virtual address space in which the process is executing.

20. The method of claim 19 further includes changing a hardware state information in a Kernel to cause each process executing in each virtual address space to be associated with the session data that is stored in the virtual address space in which the process is executing.

21. The method of claim 12 wherein the step of creating a maximum number of virtual address spaces when a server is started is performed by creating a maximum number of virtual address spaces when a database server is started.

22. A computer readable medium carrying one or more sequences of instructions for managing an amount of memory available to processes within a computer system, wherein execution of the one or more sequences of instructions by one or more processors causes the one or more processors to perform the steps of:

detecting a condition that indicates that a first set of virtual address spaces do not provide sufficient memory;

in response to detecting the condition that indicates that the first set of virtual address spaces do not provide sufficient memory, dynamically creating at least one additional set of virtual address spaces to add to the first set of virtual address spaces to produce a second set of virtual address spaces; and allowing processes executing in each virtual address space of the second set of virtual address spaces to access a shared virtual memory region.

23. The computer readable medium of claim 22 wherein the step for allowing processes executing in each virtual address space of the second set of virtual address spaces to access a shared virtual memory region further includes mapping the shared virtual memory region to a particular range of virtual addresses, wherein each virtual address space in the second set of virtual address spaces uses the shared virtual memory region as physical memory for the particular range of virtual addresses.

24. The computer readable medium of claim 22 wherein:
the step of detecting a condition that indicates that a first set of virtual address spaces do not provide sufficient memory further includes the step of detecting a condition that indicates that one or more new sessions are to be created in the computer system; and the method further includes the step of assigning the one or more new sessions to the one or more virtual address spaces in the second set of virtual address spaces.

25. The computer readable medium of claim 24 wherein the step of assigning the one or more new sessions to the one or more virtual address spaces in the second set of virtual address spaces is performed based on current usage of the first set of virtual address spaces.

26. The computer readable medium of claim 24 wherein the step of assigning the one or more new sessions to the one or more virtual address spaces in the second set of virtual address spaces includes using a token to identify which virtual address space is assigned to each new session.

27. The computer readable medium of claim 22 further includes selecting a minimum number of virtual address spaces to be created as the first set of virtual address spaces.

28. The computer readable medium of claim 22 further includes selecting a maximum number of virtual address spaces that can be added to the first set of virtual address spaces to produce the second set of virtual address spaces.

29. The computer readable medium of claim 28 further includes allowing a user to specify the maximum number of virtual address spaces that can be added to the first set of virtual address spaces to produce the second set of virtual address spaces.

30. The computer readable medium of claim 22 further includes employing a latching mechanism that resides in the shared virtual memory region to lock data.

31. The computer readable medium of claim 22 wherein each process executing in each virtual address space of the second set of virtual address spaces is associated with a session data that is stored in the virtual address space in which the process is executing.

32. The computer readable medium of claim 31 further includes changing a hardware state information in a Kernel to cause each process executing in each virtual address space of the second set of virtual address spaces to be associated with the session data that is stored in the virtual address space in which the process is executing.

33. A computer readable medium carrying one or more sequences of instructions for managing an amount of memory available to processes within a computer system, wherein execution of the one or more sequences of instructions by one or more processors causes the one or more processors to perform the steps of:

creating a maximum number of virtual address spaces when a server is started; and allowing processes executing in each virtual address space to access a shared memory region.

34. The computer readable medium of claim 33 wherein the step for allowing processes executing in each virtual address space to access a shared memory region further includes mapping the shared memory region to a particular range of virtual addresses, wherein each virtual address space uses the shared memory region as physical memory for the particular range of virtual addresses.

35. The computer readable medium of claim 33 further includes the step of assigning one or more new sessions to the virtual address spaces.

36. The computer readable medium of claim 35 wherein the step of assigning the one or more new sessions to the virtual address spaces is performed based on current usage of the virtual address spaces.

37. The computer readable medium of claim 35 wherein the step of assigning the one or more new sessions to the one or more virtual address spaces includes using a token to identify which virtual address space is assigned to each new session.

38. The computer readable medium of claim 33 further including instructions for allowing a user to specify the maximum number of virtual address spaces that can be created when the server is started.

39. The computer readable medium of claim 33 further includes employing a latching mechanism that resides in the shared memory region to lock data.

40. The computer readable medium of claim 33 wherein each process executing in each virtual address space is associated with a session data that is stored in the virtual address space in which the process is executing.

41. The computer readable medium of claim 40 further includes changing a hardware state information in a Kernel to cause each process executing in each virtual address space to be associated with the session data that is stored in the virtual address space in which the process is executing.

42. The computer readable medium of claim 33 wherein sequence of instructions for creating a maximum number of virtual address spaces when a server is started include instructions for creating a maximum number of virtual address spaces when a database server is started.

* * * * *